US012340247B2

(12) United States Patent
Lee et al.

(10) Patent No.: US 12,340,247 B2
(45) Date of Patent: Jun. 24, 2025

(54) ELECTRONIC DEVICE FOR PROCESSING NEURAL NETWORK MODEL AND METHOD OF OPERATING THE SAME

(71) Applicant: Samsung Electronics Co., Ltd., Suwon-si (KR)

(72) Inventors: Junhyuk Lee, Suwon-si (KR); Hyunbin Park, Suwon-si (KR); Seungjin Yang, Suwon-si (KR); Jin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 17/745,320

(22) Filed: May 16, 2022

(65) Prior Publication Data

US 2023/0072337 A1    Mar. 9, 2023

Related U.S. Application Data

(63) Continuation of application No. PCT/KR2022/005700, filed on Apr. 21, 2022.

(30) Foreign Application Priority Data

Sep. 7, 2021 (KR) .......................... 10-2021-0119368
Oct. 25, 2021 (KR) .......................... 10-2021-0142991

(51) Int. Cl.
*G06F 9/50* (2006.01)
*G06N 3/08* (2023.01)
*H04L 5/00* (2006.01)

(52) U.S. Cl.
CPC ............. *G06F 9/5016* (2013.01); *G06N 3/08* (2013.01); *H04L 5/0064* (2013.01)

(58) Field of Classification Search
CPC ........ G06F 9/5016; G06N 3/08; H04L 5/0064
See application file for complete search history.

(56) References Cited

U.S. PATENT DOCUMENTS

| | | | |
|---|---|---|---|
| 6,167,088 A | 12/2000 | Sethuraman | |
| 11,561,833 B1 * | 1/2023 | Heaton | ............... G06F 9/45504 |
| 11,580,719 B2 * | 2/2023 | Desappan | ............... G06V 10/82 |
| 2006/0190650 A1 * | 8/2006 | Burchard | ............... G06F 13/36 |
| | | | 710/116 |

(Continued)

FOREIGN PATENT DOCUMENTS

| | | |
|---|---|---|
| CN | 104965763 A | 10/2015 |
| CN | 110070181 A | 7/2019 |

(Continued)

OTHER PUBLICATIONS

Wang et al., "HAQ: Hardware-Aware Automated Quantization with Mixed Precision", arXiv: 1811. 08886v3, Apr. 2019 [Jul. 7, 2022]. <https://arxiv.org/pdf/1811.08886v3.pdf> pp. 2-4; and figure 2.

(Continued)

*Primary Examiner* — April Y Blair
*Assistant Examiner* — Jonathan R Labud
(74) *Attorney, Agent, or Firm* — Jefferson IP Law, LLP (57) ABSTRACT

An electronic device is provided. The electronic device includes a memory, and a processor including a resource management unit and a neural processing unit. The processor may be configured to obtain an execution request for a specific function operating based on a specific neural network model, identify an available bandwidth of the memory through the resource management unit, and quantize the specific neural network model based on the available bandwidth of the memory through the neural processing unit.

16 Claims, 5 Drawing Sheets

(56) References Cited

U.S. PATENT DOCUMENTS

| | | |
|---|---|---|
| 2016/0328647 A1 | 11/2016 | Lin et al. |
| 2019/0102673 A1 | 4/2019 | Leibovich et al. |
| 2019/0147324 A1 | 5/2019 | Martin |
| 2019/0147364 A1 | 5/2019 | Alt et al. |
| 2019/0392300 A1 | 12/2019 | Weber et al. |
| 2020/0107025 A1* | 4/2020 | Karczewicz ......... H04N 19/176 |
| 2020/0125926 A1 | 4/2020 | Choudhury et al. |
| 2020/0184320 A1* | 6/2020 | Croxford ............... G06N 3/048 |
| 2021/0160499 A1 | 5/2021 | Wang et al. |
| 2022/0092346 A1* | 3/2022 | Jones .................... G06V 10/70 |
| 2022/0391776 A1* | 12/2022 | Mody ................... G06F 9/4881 |
| 2023/0168921 A1* | 6/2023 | Kim ........................ G06N 3/08 712/220 |

FOREIGN PATENT DOCUMENTS

| | | |
|---|---|---|
| CN | 111340226 A | 6/2020 |
| EP | 3 767 548 A1 | 1/2021 |
| KR | 10-2021-0009584 A | 1/2021 |

OTHER PUBLICATIONS

International Search Report dated Jul. 22, 2022, issued in International Application No. PCT/KR2022/005700.
Written Opinion dated Jul. 22, 2022, issued in International Application No. PCT/KR2022/005700.
Manuele Rusci et al., Memory-Driven Mixed Low Precision Quantization For Enabling Deep Network Inference On Microcontrollers, May 30, 2019, XP081366031.
Marios Fournarakis et al., In-Hindsight Quantization Range Estimation for Quantized Training, May 10, 2021, XP081960724.
Tian Huang et al., Adaptive Precision Training for Resource Constrained Devices, Dec. 23, 2020, XP081845418.
European Search Report dated Sep. 10, 2024, issued in European Application No. 22867486.7.

* cited by examiner

| Available bandwidth section of memory | Activation bit depth |
|---|---|
| First section (THD1<X) | First bit depth |
| Second section (THD2<X≤THD1) | Second bit depth |
| Third section (THD3<X≤THD2) | Third bit depth |
| Fourth section (X≤THD3) | Forth bit depth |

FIG. 5

ELECTRONIC DEVICE FOR PROCESSING NEURAL NETWORK MODEL AND METHOD OF OPERATING THE SAME

CROSS-REFERENCE TO RELATED APPLICATION(S)

This application is a continuation application, claiming priority under § 365(c), of an International application No. PCT/KR2022/005700, filed on Apr. 21, 2022, which is based on and claims the benefit of a Korean patent application number 10-2021-0119368, filed on Sep. 7, 2021, in the Korean Intellectual Property Office, and of a Korean patent application number 10-2021-0142991, filed on Oct. 25, 2021, in the Korean Intellectual Property Office, the disclosure of each of which is incorporated by reference herein in its entirety.

TECHNICAL FIELD

Various embodiments of the disclosure relate to an electronic device for processing a neural network model and a method of operating the same.

BACKGROUND ART

An artificial intelligence system is a computer system that implements human-level intelligence. In this system, the machine learns and judges on its own, so the more it is used, the better its recognition rate.

Artificial intelligence technology may consist of machine learning (deep learning) technology and element technologies. The machine learning technology may use an algorithm that categorizes and learns the characteristics of input data by itself, and the element technologies may use machine learning algorithms to mimic functions such as cognition and judgment of the human brain.

The element technologies may include at least one of, for example, linguistic understanding technology for recognizing human languages and texts, visual understanding technology for recognizing objects just like human vision, reasoning/prediction technology for logically reasoning and predicting by judging information, knowledge expression technology for processing human experience information as knowledge data, and motion control technology for controlling autonomous driving of a vehicle and movement of a robot.

The above information is presented as background information only to assist with an understanding of the disclosure. No determination has been made, and no assertion is made, as to whether any of the above might be applicable as prior art with regard to the disclosure.

DISCLOSURE

Technical Problem

If failing to identify an available bandwidth of a memory in real time, a processor of an electronic device may not accurately calculate the memory bandwidth required to process the neural network model, and thus may not satisfy the quality of service (QoS) of the processing result on the neural network model.

According to various embodiments, in an electronic device and an operating method thereof, a processor may identify an available bandwidth of a memory in real time, and when quantizing the neural network model, the processor may dynamically apply a bit depth according to the available bandwidth of the memory, and thus provide a processing result on the quantized neural network model using the dynamically applicable bit depth.

Aspects of the disclosure are to address at least the above-mentioned problems and/or disadvantages and to provide at least the advantages described below. Accordingly, an aspect of the disclosure is to provide an electronic device for processing a neural network model and a method of operating the same.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a memory, and a processor including a resource management unit and a neural processing unit, and the processor may be configured to obtain an execution request for a specific function operating based on a specific neural network model, identify an available bandwidth of the memory through the resource management unit, and quantize the specific neural network model based on the available bandwidth of the memory through the neural processing unit.

In accordance with an aspect of the disclosure, a method of operating an electronic device is provided. The electronic device includes obtaining an execution request for a specific function operating based on a specific neural network model, identifying an available bandwidth of a memory of the electronic device through a resource management unit included in a processor of the electronic device, and quantizing the specific neural network model based on the available bandwidth of the memory through a neural processing unit included in the processor.

Advantageous Effects

According to various embodiments, an electronic device and an operating method thereof may be provided, in which a processor may not only identify the available bandwidth of the memory in real time, but also dynamically quantize an activation bit depth related to the neural network model using the available bandwidth of the memory, thereby satisfying the quality of service of the processing result on the neural network model.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
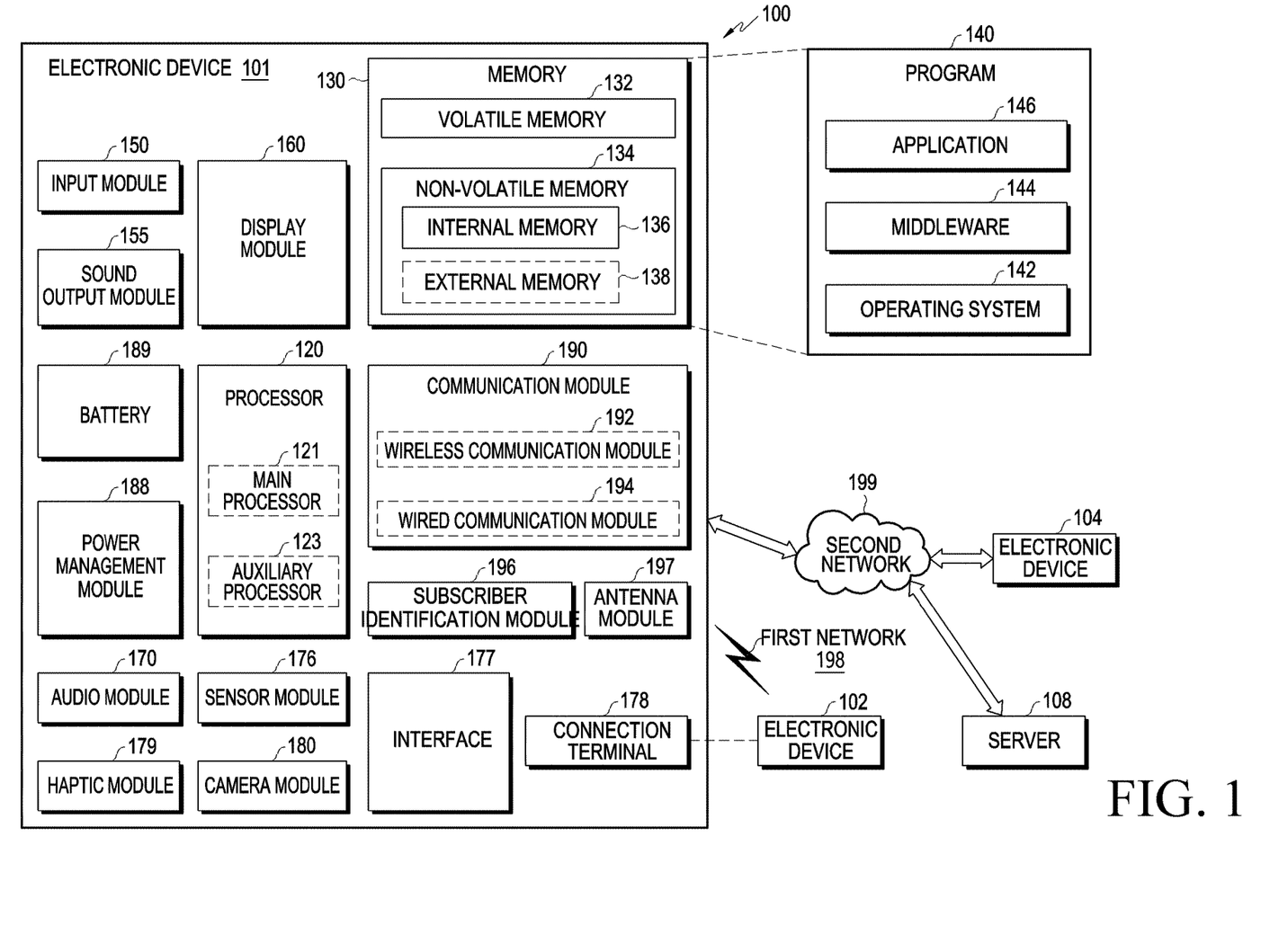
FIG. 1 is a block diagram of an electronic device in a network environment according to various embodiments of the disclosure.

FIG. 1 is a block diagram illustrating an electronic device in a network environment according to various embodiments of the disclosure.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™ wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
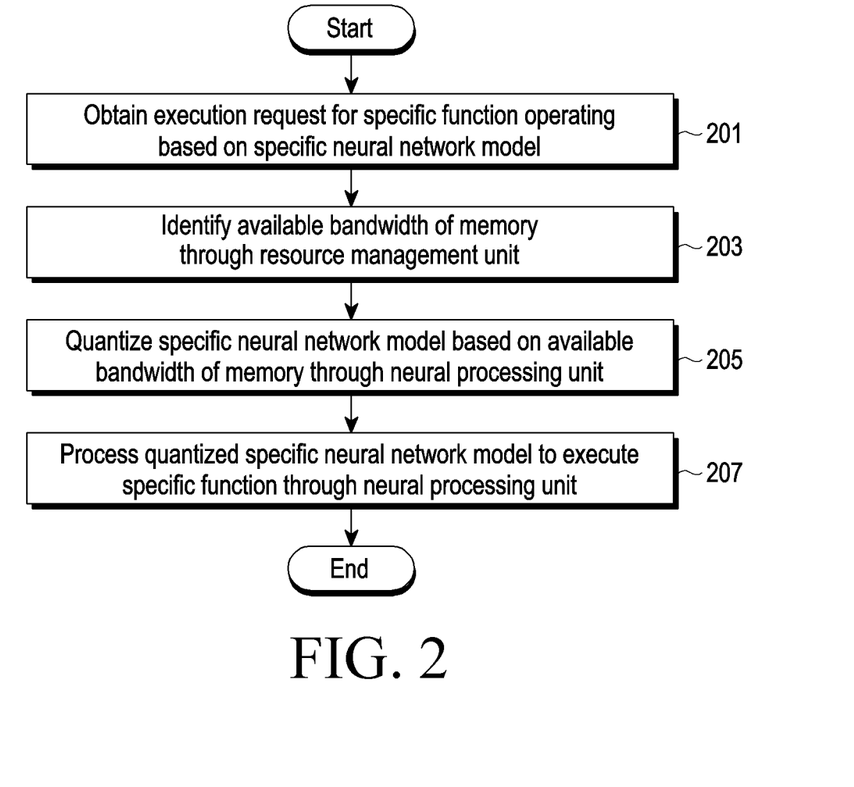
FIG. 2 is a flowchart illustrating a method of operating an electronic device according to various embodiments of the disclosure.

FIG. 2 is a flowchart illustrating a method of operating an electronic device (e.g., the electronic device 101 of FIG. 1) according to various embodiments of the disclosure.

Figure 3:
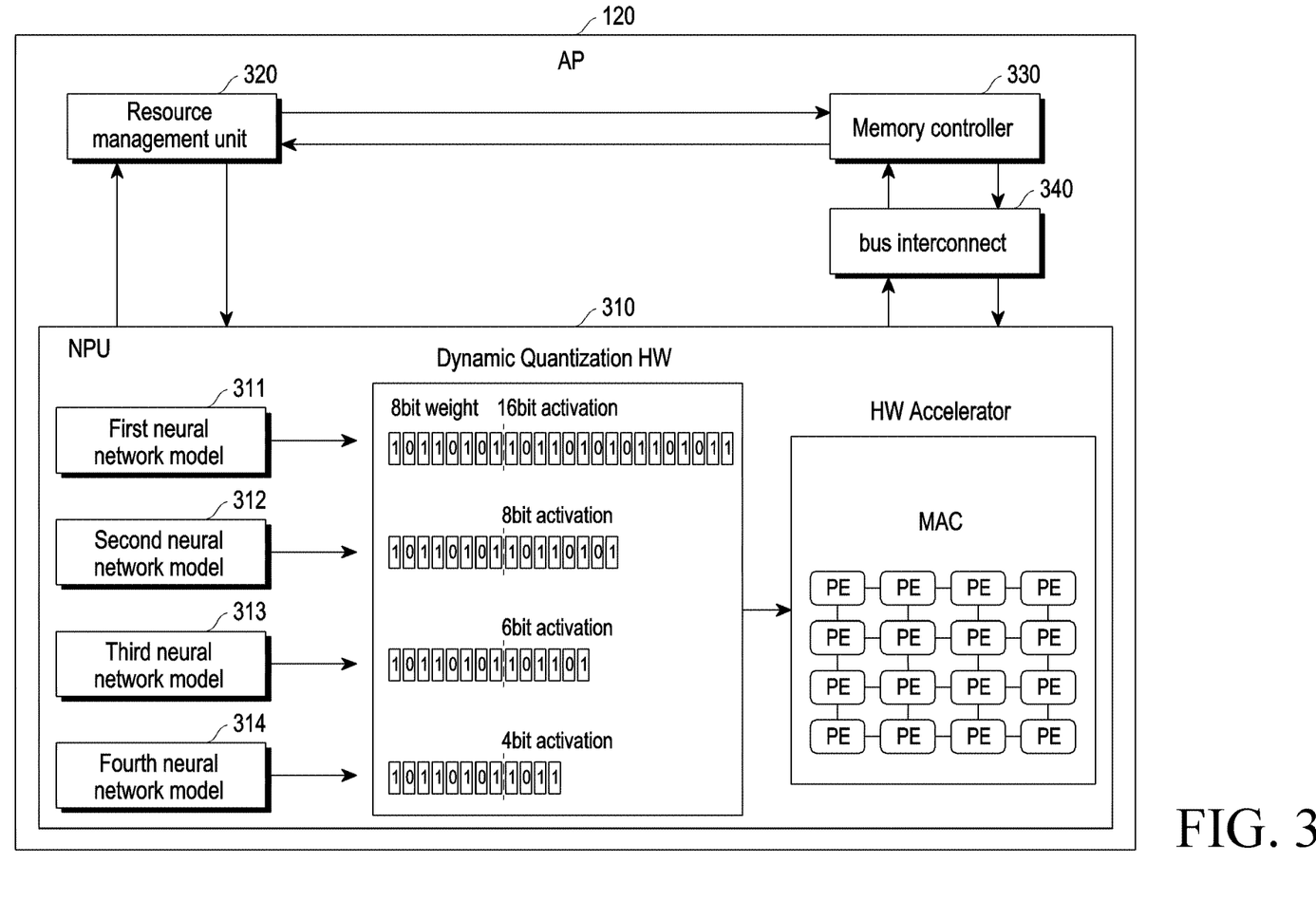
FIG. 3 is a block diagram of a processor for setting an activation bit depth in units of a neural network model according to various embodiments of the disclosure.

FIG. 3 is a block diagram of a processor (e.g., the processor 120 in FIG. 1) for setting an activation bit depth in units of a neural network model according to various embodiments of the disclosure.

Figure 4:
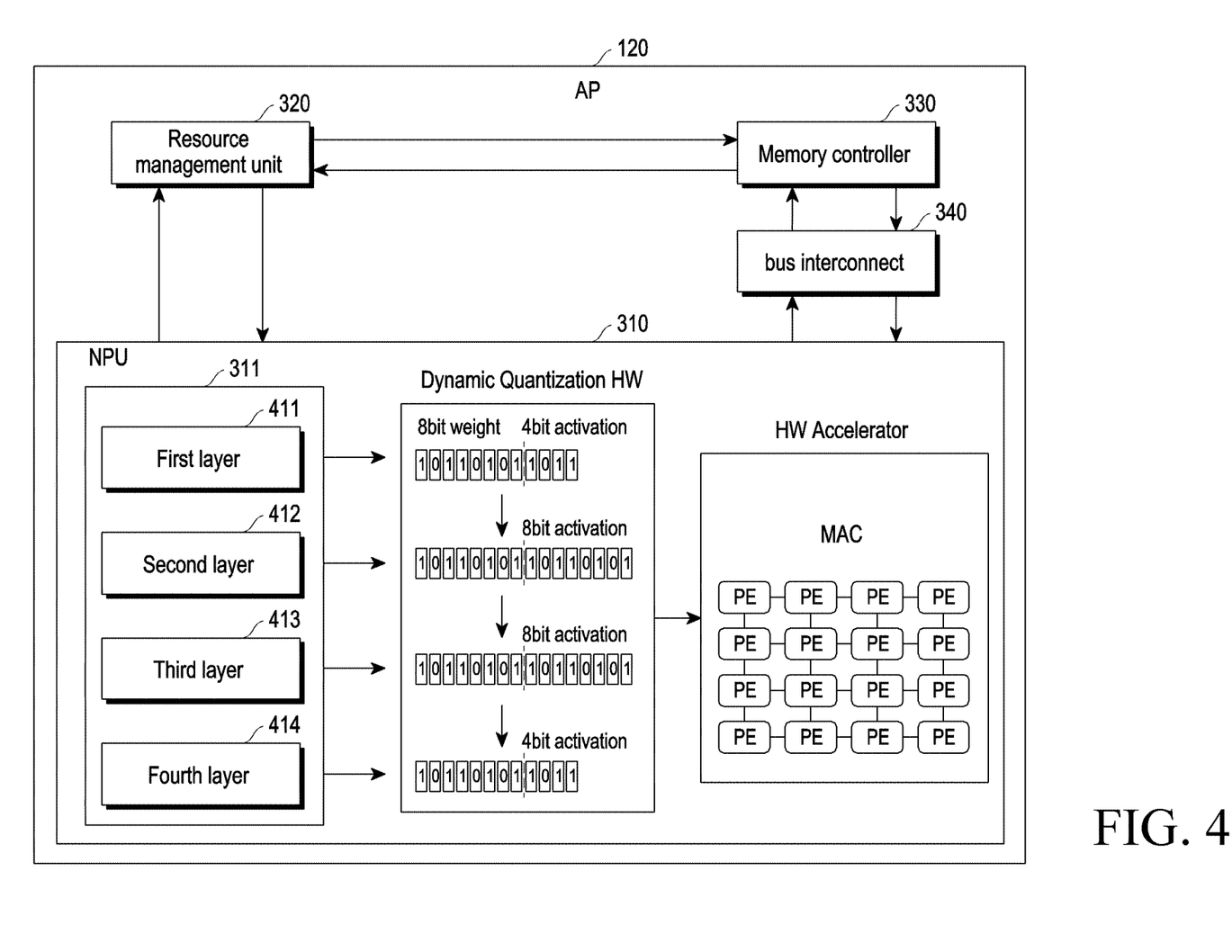
FIG. 4 is a block diagram of a processor for setting an activation bit depth in unites of a layer in a neural network model according to various embodiments of the disclosure.

FIG. 4 is a block diagram of a processor 120 for setting an activation bit depth in unites of a layer in a neural network model according to various embodiments of the disclosure.

Figure 5:
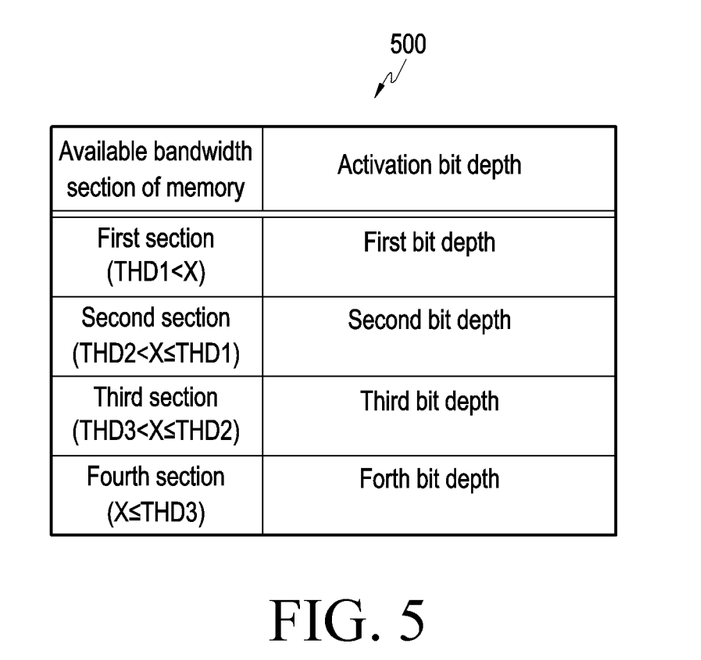
FIG. 5 illustrates a table defining activation bit depths corresponding to available bandwidth sections of a memory according to various embodiments of the disclosure.

FIG. 5 illustrates a table defining activation bit depths corresponding to available bandwidth sections of a memory (e.g., the memory 130 of FIG. 1) according to various embodiments of the disclosure.

In operation 201, according to various embodiments, the electronic device 101 (e.g., the processor 120 of FIG. 1) may obtain a request to execute a specific function operating based on a specific neural network model. According to an embodiment, a specific function executed in the electronic device 101 may operate based on a specific neural network model. For example, referring to FIG. 3, a first function (e.g., a classification function in a preview image acquired through a front single camera) by a camera application may operate based on a first neural network model 311 (e.g., a classification model (Mobilenet v2, Inception v4)), a second function (e.g., a burst shot function of a rear camera) by the camera application may operate based on a second neural network model 312 (e.g., a burst shot segmentation model), a third function (e.g., a wide lens function in a live focus mode) by the camera application may operate based on a third neural network model 313, and a fourth function (e.g., a dual camera function) by the camera application may operate based on a fourth neural network model 314. According to an embodiment, the request for executing a specific function may include a request for a multiply and accumulate (MAC) operation for a specific neural network model and/or a request for a MAC operation for each layer of a specific neural network model.

According to an embodiment, the electronic device 101 may receive a neural network model (e.g., a model trained with floating point (FP) 32) that has been trained from an external electronic device (e.g., the server 108 of FIG. 1) through a communication module (e.g., the communication module 190 of FIG. 1). According to an embodiment, when receiving a neural network model from the external electronic device 108, the electronic device 101 may receive information about the minimum activation bit depth and the maximum activation bit depth applicable to the neural network model together. According to an embodiment, when receiving the neural network model from the external electronic device 108, the electronic device 101 may receive information on the minimum activation bit depth and the maximum activation bit depth applicable to each layer of the neural network model together.

In operation 203, according to various embodiments, the electronic device 101 (e.g., the processor 120 of FIG. 1) may identify an available bandwidth of the memory 130 through a resource management unit included in the processor 120. The available bandwidth of the memory 130 means an available bandwidth of the memory 130, excluding the currently used bandwidth from the maximum bandwidth of the memory 130. According to an embodiment, the processor 120 may include a resource management unit for performing resource management, and the resource management unit may define a register for monitoring the bandwidth of the memory 130. For example, referring to FIG. 3, the electronic device 101 may receive information about the available bandwidth of the memory 130 from a memory controller 330 through a resource management unit 320 (e.g., a memory system resource partitioning and monitoring (MPAM) unit) included in the processor 120, and provide the information on the available bandwidth to a neural processing unit (NPU) 310, thereby identifying the available bandwidth of the memory 130. According to an embodiment, the resource management unit 320 may adjust the memory footprint of the memory 130 to be allocated to the processor 120 and the priority of a process to be processed by the processor 120.

According to various embodiments, the electronic device 101 (e.g., the processor 120 of FIG. 1) may identify the available bandwidth of the memory 130 through the resource management unit 320 based on a predetermined period. For example, referring to FIG. 3, the electronic device 101 may receive information about the available bandwidth of the memory 130 from the memory controller 330 through the resource management unit 320 at the predetermined period, and provide the information on the available bandwidth to the neural processing unit 310.

According to various embodiments, the electronic device 101 (e.g., the processor 120 of FIG. 1) may identify the available bandwidth of the memory 130 through the resource management unit 320 based on obtaining a request for execution of a specific function. For example, referring to FIG. 3, when obtaining a request for execution of a first function operating based on the first neural network model 311, the electronic device 101 may provide a request to identify the available bandwidth of the memory 130 to the resource management unit 320 through the neural processing unit 310, receive information on the available bandwidth of the memory 130 from the memory controller 330 through the resource management unit 320, and provide the information on the available bandwidth to the neural processing unit 310.

According to various embodiments, the electronic device 101 (e.g., the processor 120 of FIG. 1) may identify the available bandwidth of the memory 130 through the resource management unit 320 based on obtaining a processing request for a specific layer of a specific neural network model. For example, referring to FIG. 4, the electronic device 101 may identify a first available bandwidth of the memory 130 through the resource management unit 320 based on obtaining a processing request for a first layer 411 of the first neural network model 311. As another example, referring to FIG. 4, after completing the processing of the first layer 411 of the first neural network model 311, the electronic device 101 may identify a second available bandwidth of the memory 130 through the resource management unit 320 based on obtaining a processing request for a second layer 412. As further another example, referring to FIG. 4, after completing the processing of the second layer 412 of the first neural network model 311, the electronic device 101 may identify a third available bandwidth of the memory 130 through the resource management unit 320 based on obtaining a processing request for a third layer 413. As yet another example, referring to FIG. 4, after completing the processing of the third layer 413 of the first neural network model 311, the electronic device 101 may identify a fourth available bandwidth of the memory 130 through the resource management unit 320 based on obtaining a processing request for a fourth layer 414. In this way, whenever obtaining a processing request for a layer of a specific neural network model, the electronic device 101 may identify the available bandwidth of the memory 130 at that time through the resource management unit 320.

In operation 205, according to various embodiments, the electronic device 101 (e.g., the processor 120 of FIG. 1) may quantize a specific neural network model based on the available bandwidth of the memory 130 through the neural processing unit 310.

According to various embodiments, the electronic device 101 (e.g., the processor 120 of FIG. 1) may select an activation bit depth corresponding to the available bandwidth of the memory 130. According to an embodiment, the electronic device 101 may select an activation bit depth corresponding to the available bandwidth of the memory 130 from a predefined table. According to an embodiment, the electronic device 101 may identify a section including the available bandwidth of the memory 130 from the predefined table, and select an activation bit depth corresponding to the identified section. For example, referring to FIG. 5, if an available bandwidth X of the memory 130 out of the maximum bandwidth (e.g., 44 GB/s) of the memory 130 exceeds a first threshold THD1 (e.g., 33 GB/s), the electronic device 101 may identify a first section including the available bandwidth of the memory 130 from a predefined table 500, and select a first bit depth (e.g., 16 bits) corresponding to the identified first section as an activation bit depth. As another example, referring to FIG. 5, if an available bandwidth X of the memory 130 is less than or equal to the first threshold THD1 (e.g., 33 GB/s) and exceeds a second threshold THD2 (e.g., 22 GB/s), the electronic device 101 may identify a second section including the available bandwidth of the memory 130 from the predefined table 500, and select a second bit depth (e.g., 8 bits) corresponding to the identified second section as an activation bit depth. As further another example, referring to FIG. 5, if the available bandwidth X of the memory 130 is less than or equal to the second threshold THD2 (e.g., 22 GB/s) and exceeds a third threshold THD3 (e.g., 11 GB/s), the electronic device 101 may identify a third section including the available bandwidth of the memory 130 from the predefined table 500, and select a third bit depth (e.g., 6 bits) corresponding to the identified third section as an activation bit depth. As yet another example, referring to FIG. 5, if the available bandwidth X of the memory 130 is less than or equal to the third threshold THD3 (e.g., 11 GB/s), the electronic device 101 may identify a fourth section including the available bandwidth of the memory 130 from the predefined table 500, and select a fourth bit depth (e.g., 4 bits) corresponding to the identified fourth section as an activation bit depth. Ranges of the sections defined in the above table 500 and the number of bits of the activation bit depth are only an example, and may be variously set by the manufacturer of the electronic device 101, and according to one embodiment, the electronic device 101 may store the predefined table 500 in the memory 130.

According to various embodiments, the electronic device 101 (e.g., the processor 120 of FIG. 1) may quantize a specific neural network model by performing dynamic quantization on a specific activation bit depth of the specific neural network model based on the activation bit depth selected from the predefined table 500, while maintaining a specific weight bit depth of the specific neural network model through the neural processing unit 310. For example, referring to FIG. 3, the electronic device 101 may perform dynamic quantization to set a first activation bit depth of the first neural network model 311 to an activation bit depth (e.g., a 16-bit depth) selected from the predefined table 500, while maintaining a first weight bit depth (e.g., an 8-bit depth) of the first neural network model 311 through the neural processing unit 310. In this way, the electronic device 101 may perform dynamic quantization to set each activation bit depth of the second neural network model 312 to the fourth neural network model 314 to an activation bit depth corresponding to the available bandwidth of the memory 130, identified at the time of processing each neural network model. According to an embodiment, if the activation bit depth selected from the predefined table 500 is a bit depth between the minimum activation bit depth and the maximum activation bit depth applicable to a specific neural network model, the electronic device 101 may perform dynamic quantization to set a specific activation bit depth of the specific neural network model to an activation bit depth selected from the predefined table 500, while maintaining a specific weight bit depth of the specific neural network model through the neural processing unit 310. According to an embodiment, if the activation bit depth selected from the predefined table 500 is a bit depth smaller than the minimum activation bit depth applicable to a specific neural network model, the electronic device 101 may perform dynamic quantization to set a specific activation bit depth of the specific neural network model to the minimum activation bit depth applicable to a specific neural network model, while maintaining a specific weight bit depth of the specific neural network model through the neural processing unit 310. According to an embodiment, if the activation bit depth selected from the predefined table 500 is a bit depth larger than the maximum activation bit depth applicable to a specific neural network model, the electronic device 101 may perform dynamic quantization to set a specific activation bit depth of the specific neural network model to the maximum activation bit depth applicable to the specific neural network model, while maintaining a specific weight bit depth of the specific neural network model through the neural processing unit 310.

According to various embodiments, the electronic device 101 (e.g., the processor 120 of FIG. 1) may quantize a specific neural network model by performing dynamic quantization on a specific activation bit depth of a specific layer of the specific neural network model based on the activation bit depth selected from the predefined table 500, while maintaining a specific weight bit depth of the specific layer of the specific neural network model through the neural processing unit 310. For example, referring to FIG. 4, the electronic device 101 may perform dynamic quantization to set the first activation bit depth of the first layer 411 to the activation bit depth (e.g., a 4-bit depth) selected from the predefined table 500, while maintaining the first weight bit depth (e.g., an 8-bit depth) of the first layer 411 of the first neural network model 311 through the neural processing unit 310. In this way, the electronic device 101 may perform dynamic quantization to set each activation bit depth of the second layer 412 to the fourth layer 414 of the first neural network model 311 to an activation bit depth corresponding to the available bandwidth of the memory 130, identified at the time of processing each layer. According to an embodiment, if the activation bit depth selected from the predefined table 500 is a bit depth between the minimum activation bit depth and the maximum activation bit depth applicable to a specific layer of the specific neural network model, the electronic device 101 may perform dynamic quantization to set a specific activation bit depth of the specific layer of the specific neural network model to the activation bit depth selected from the predefined table 500, while maintaining a specific weight bit depth of the specific layer of the specific neural network model through the neural processing unit 310. According to an embodiment, if the activation bit depth selected from the predefined table 500 is a bit depth smaller than the minimum activation bit depth applicable to a specific layer of the specific neural network model, the electronic device 101 may perform dynamic quantization to set a specific activation bit depth of the specific layer of the specific neural network model to the minimum activation bit depth, while maintaining a specific weight bit depth of the specific layer of the specific neural network model through the neural processing unit 310. According to an embodiment, if the activation bit depth selected from the predefined table 500 is a bit depth greater than the maximum activation bit depth applicable to a specific layer of the specific neural network model, the electronic device 101 may perform dynamic quantization to set a specific activation bit depth of the specific layer of the specific neural network model to the maximum activation bit depth, while maintaining a specific weight bit depth of the specific layer of the specific neural network model through the neural processing unit 310.

In operation 207, according to various embodiments, the electronic device 101 (e.g., the processor 120 of FIG. 1) may process the quantized specific neural network model to execute a specific function through the neural processing unit 310.

According to various embodiments, the electronic device 101 (e.g., the processor 120 of FIG. 1) may process the quantized specific neural network model using the quantized activation bit depth through the neural processing unit 310. According to an embodiment, the electronic device 101 may perform a MAC operation on a specific neural network model using a specific activation bit depth. For example, referring to FIG. 3, in order to execute the first function (e.g., a classification function in a preview image obtained through the front single camera) by the camera application, the electronic device 101 may quantize the first neural network model 311 to the first activation bit depth (e.g., a 16-bit depth), and then process it by a MAC operation in the first neural network model 311 using the first weight bit depth (e.g., an 8-bit depth) and the first activation bit depth (e.g., a 16-bit depth). According to an embodiment, the electronic device 101 may store a result of performing the MAC operation on a specific neural network model in the memory 130 through the neural processing unit 310. For example, referring to FIG. 3, the electronic device 101 may transfer, through the neural processing unit 310, the result of performing the MAC operation on the first neural network model 311 to a bus interconnector 340 and the memory controller 330, and store the result of performing the MAC operation in the memory 130.

According to various embodiments, the electronic device 101 (e.g., the processor 120 of FIG. 1) may process a specific layer of the quantized specific neural network model using the quantized activation bit depth through the neural processing unit 310. According to an embodiment, the electronic device 101 may perform a MAC operation on the specific layer of the specific neural network model using a specific activation bit depth. For example, referring to FIG. 4, in order to execute the first function, the electronic device 101 may quantize the first layer 411 of the first neural network model 311 to the first activation bit depth (e.g., a 4-bit depth), and then process it by a MAC operation in the first layer 411 using the first weight bit depth (e.g., an 8-bit depth) and the first activation bit depth (e.g., a 4-bit depth). According to an embodiment, the electronic device 101 may store, in the memory 130, a result of performing a MAC operation on a specific layer of a specific neural network model through the neural processing unit 310. For example, referring to FIG. 4, the electronic device 101 may transfer, through the neural processing unit 310, the result of performing a MAC operation on the first layer 411 of the first neural network model 311 to the bus interconnector 340 and the memory controller 330, and store the result of performing the MAC operation in the memory 130.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, an electronic device (e.g., the electronic device 101 of FIG. 1) may include a memory (e.g., the memory 130 of FIG. 1), and a processor (e.g., the processor 120 of FIG. 1) including a resource management unit (e.g., the resource management unit 320 of FIG. 3) and a neural processing unit (e.g., the neural processing unit 310 of FIG. 3). The processor may be configured to obtain an execution request for a specific function operating based on a specific neural network model, identify an available bandwidth of the memory through the resource management unit, and quantize the specific neural network model based on the available bandwidth of the memory through the neural processing unit.

According to various embodiments, the processor may be configured to identify the available bandwidth of the memory based on a predetermined period.

According to various embodiments, the processor may be configured to identify the available bandwidth of the memory based on obtaining the execution request for the specific function.

According to various embodiments, the processor may be configured to identify the available bandwidth of the memory, based on obtaining a processing request for a specific layer of the specific neural network model.

According to various embodiments, the processor may be configured to select an activation bit depth corresponding to the available bandwidth of the memory.

According to various embodiments, the processor may be configured to identify a section including the available bandwidth of the memory from a predefined table (e.g., the predefined table 500 of FIG. 5), and select a bit depth corresponding to the identified section as the activation bit depth.

According to various embodiments, the processor may be configured to identify a first section including the available bandwidth of the memory from the predefined table based on the available bandwidth of the memory exceeding a first threshold, and select a first bit depth corresponding to the first section as the activation bit depth. The first bit depth may be a 16-bit depth.

According to various embodiments, the processor may be configured to identify a second section including the available bandwidth of the memory from the predefined table based on the available bandwidth of the memory being less than or equal to the first threshold and exceeding a second threshold, and select a second bit depth corresponding to the second section as the activation bit depth. The second bit depth may be an 8-bit depth.

According to various embodiments, the processor may be configured to identify a third section including the available bandwidth of the memory from the predefined table based on the available bandwidth of the memory being less than or equal to the second threshold and exceeding a third threshold, and select a third bit depth corresponding to the third section as the activation bit depth. The third bit depth may be a 6-bit depth.

According to various embodiments, the processor may be configured to quantize the specific neural network model by performing dynamic quantization on a specific activation bit depth of the specific neural network model based on the activation bit depth while maintaining a specific weight bit depth of the specific neural network model through the neural processing unit, and perform a MAC operation on the quantized specific neural network model using the specific activation bit depth.

According to various embodiments, the processor may be configured to quantize the specific neural network model by performing dynamic quantization on a specific activation bit depth of the specific layer of the specific neural network model based on the activation bit depth while maintaining a specific weight bit depth of a specific layer of the specific neural network model through the neural processing unit, and perform a MAC operation on the specific layer of the quantized specific neural network model using the specific activation bit depth.

According to various embodiments, a method of operating an electronic device may include obtaining an execution request for a specific function operating based on a specific neural network model, identifying an available bandwidth of a memory of the electronic device through a resource management unit included in a processor of the electronic device, and quantizing the specific neural network model based on the available bandwidth of the memory through a neural processing unit included in the processor.

According to various embodiments, identifying the available bandwidth of the memory may include identifying the available bandwidth of the memory based on a predetermined period.

According to various embodiments, identifying the available bandwidth of the memory may include identifying the available bandwidth of the memory based on obtaining the execution request for the specific function.

According to various embodiments, identifying the available bandwidth of the memory may include identifying the available bandwidth of the memory based on obtaining a processing request for a specific layer of the specific neural network model.

According to various embodiments, quantizing the specific neural network model may include selecting an activation bit depth corresponding to the available bandwidth of the memory.

According to various embodiments, selecting the activation bit depth my include identifying a section including the available bandwidth of the memory from a predefined table, and selecting a bit depth corresponding to the identified section as the activation bit depth.

According to various embodiments, selecting the activation bit depth may include identifying a first section including the available bandwidth of the memory from the predefined table based on the available bandwidth of the memory exceeding a first threshold, and selecting a first bit depth corresponding to the first section as the activation bit depth. The first bit depth may be a 16-bit depth.

According to various embodiments, selecting the activation bit depth may include identifying a second section including the available bandwidth of the memory from the predefined table based on the available bandwidth of the memory being less than or equal to the first threshold and exceeding a second threshold, and selecting a second bit depth corresponding to the second section as the activation bit depth. The second bit depth may be an 8-bit depth.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   memory storing one or more computer programs; and
   one or more processors, including a resource management unit and a neural processing unit, communicatively coupled to the memory,
   wherein the one or more computer programs include computer-executable instructions that, when executed by the one or more processors individually or collectively, cause the electronic device to:
   obtain an execution request for a specific function operating based on a specific neural network model,
   identify an available bandwidth of the memory through the resource management unit,
   quantize the specific neural network model based on the available bandwidth of the memory through the neural processing unit,
   identify a section including the available bandwidth of the memory from a predefined table, and
   select a bit depth corresponding to the identified section as an activation bit depth.

2. The electronic device of claim 1, wherein the one or more computer programs further include computer-executable instructions that, when executed by the one or more processors individually or collectively, cause the electronic device to identify the available bandwidth of the memory based on a predetermined period.

3. The electronic device of claim 1, wherein the one or more computer programs further include computer-executable instructions that, when executed by the one or more processors individually or collectively, cause the electronic device to identify the available bandwidth of the memory based on obtaining the execution request for the specific function.

4. The electronic device of claim 1, wherein the one or more computer programs further include computer-executable instructions that, when executed by the one or more processors individually or collectively, cause the electronic device to identify the available bandwidth of the memory based on obtaining a processing request for a specific layer of the specific neural network model.

5. The electronic device of claim 1,
wherein the one or more computer programs further include computer-executable instructions that, when executed by the one or more processors individually or collectively, cause the electronic device to:
identify a first section including the available bandwidth of the memory from the predefined table based on the available bandwidth of the memory exceeding a first threshold, and
select a first bit depth corresponding to the first section as the activation bit depth, and
wherein the first bit depth is a 16-bit depth.

6. The electronic device of claim 5,
wherein the one or more computer programs further include computer-executable instructions that, when executed by the one or more processors individually or collectively, cause the electronic device to:
identify a second section including the available bandwidth of the memory from the predefined table based on the available bandwidth of the memory being less than or equal to the first threshold and exceeding a second threshold, and
select a second bit depth corresponding to the second section as the activation bit depth, and
wherein the second bit depth is an 8-bit depth.

7. The electronic device of claim 6,
wherein the one or more computer programs further include computer-executable instructions that, when executed by the one or more processors individually or collectively, cause the electronic device to:
identify a third section including the available bandwidth of the memory from the predefined table based on the available bandwidth of the memory being less than or equal to the second threshold and exceeding a third threshold, and
select a third bit depth corresponding to the third section as the activation bit depth, and
wherein the third bit depth is a 6-bit depth.

8. The electronic device of claim 1, wherein the one or more computer programs further include computer-executable instructions that, when executed by the one or more processors individually or collectively, cause the electronic device to:
quantize the specific neural network model by performing dynamic quantization on a specific activation bit depth of the specific neural network model based on the activation bit depth while maintaining a specific weight bit depth of the specific neural network model through the neural processing unit, and
perform a multiply and accumulate (MAC) operation on the quantized specific neural network model using the specific activation bit depth.

9. The electronic device of claim 1, wherein the one or more computer programs further include computer-executable instructions that, when executed by the one or more processors individually or collectively, cause the electronic device to:
quantize the specific neural network model by performing dynamic quantization on a specific activation bit depth of a specific layer of the specific neural network model based on the activation bit depth while maintaining a specific weight bit depth of the specific layer of the specific neural network model through the neural processing unit, and
perform a multiply and accumulate (MAC) operation on the specific layer of the quantized specific neural network model using the specific activation bit depth.

10. A method of operating an electronic device, the method comprising:
obtaining an execution request for a specific function operating based on a specific neural network model;
identifying an available bandwidth of a memory of the electronic device through a resource management unit included in a processor of the electronic device;
quantizing the specific neural network model based on the available bandwidth of the memory through a neural processing unit included in the processor;
identifying a section including the available bandwidth of the memory from a predefined table; and
selecting a bit depth corresponding to the identified section as an activation bit depth.

11. The method of claim 10, wherein the identifying of the available bandwidth of the memory includes identifying the available bandwidth of the memory based on a predetermined period.

12. The method of claim 10, wherein the identifying of the available bandwidth of the memory includes identifying the available bandwidth of the memory based on obtaining the execution request for the specific function.

13. The method of claim 10, wherein the identifying of the available bandwidth of the memory includes identifying the available bandwidth of the memory based on obtaining a processing request for a specific layer of the specific neural network model.

14. The method of claim 10,
wherein the selecting of the activation bit depth includes:
identifying a first section including the available bandwidth of the memory from the predefined table based on the available bandwidth of the memory exceeding a first threshold, and
selecting a first bit depth corresponding to the first section as the activation bit depth, and
wherein the first bit depth is a 16-bit depth.

15. The method of claim 14,
wherein the selecting of the activation bit depth includes:
identifying a second section including the available bandwidth of the memory from the predefined table based on the available bandwidth of the memory being less than or equal to the first threshold and exceeding a second threshold, and
selecting a second bit depth corresponding to the second section as the activation bit depth, and
wherein the second bit depth is an 8-bit depth.

16. The method of claim 15,
wherein the selecting of the activation bit depth includes:
- identifying a third section including the available bandwidth of the memory from the predefined table based on the available bandwidth of the memory being less than or equal to the second threshold and exceeding a third threshold, and
- selecting a third bit depth corresponding to the third section as the activation bit depth, and wherein the third bit depth is a 6-bit depth.

* * * * *